March 11, 1930.  J. V. M. RISBERG ET AL  1,750,359
PULSATOR VALVE
Filed March 15, 1928

J. V. M. Risberg and
H. Lindelof
INVENTORS

By: Marks & Clerk
Attys.

Patented Mar. 11, 1930

1,750,359

UNITED STATES PATENT OFFICE

JOHANNES VALDEMAR MÅRTEN RISBERG AND HJALMAR LINDELÖF, OF SODERTELJE, SWEDEN; SAID LINDELÖF ASSIGNOR TO SAID RISBERG

PULSATOR VALVE

Application filed March 15, 1928, Serial No. 262,015, and in Sweden May 31, 1926.

This invention relates to a pulsator valve chiefly adapted to be used in combination with a gas compressor driven by pressure-water or any other suitable pressure-medium and belonging to a refrigerating machine. The pulsator valve is adapted to be coupled to a conduit for pressure-water leading to the compressor and the object of the same is to control the admission of the pressure-water to the compressor and the discharge of the same or to effect impulses for the running of the compressor.

Figure 1:
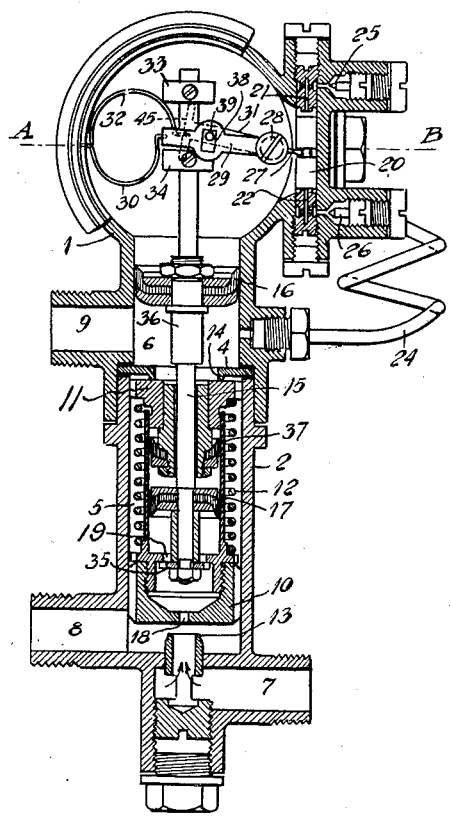
Figure 2:
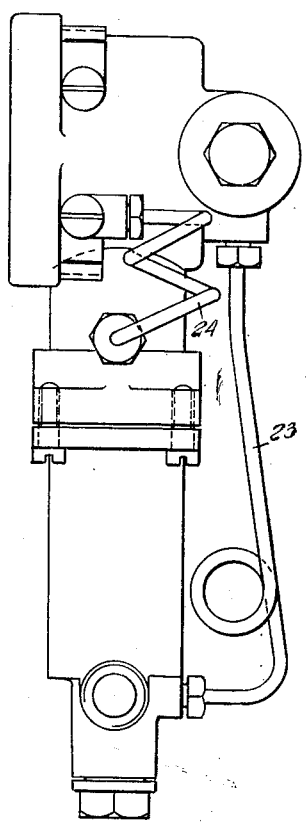
Figure 3:
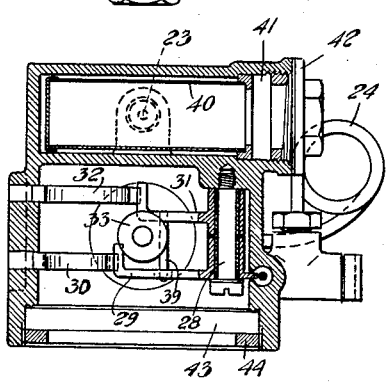
Figure 4:

Fig. 1 of the accompanying drawing shows in a longitudinal section a pulsator valve arranged in accordance with the invention. Fig. 2 is a side view of the same and Fig. 3 is a section on the line A—B of Fig. 1. Fig. 4 is a detail.

The pulsator valve is enclosed in a casing, comprising a chamber 1 and a tube shaped member 2. Member 2 is divided by a partition wall 4 into two chambers 5 and 6, the former being provided with an admission pipe 7 for pressure-water and a pipe 8, to which the conduit leading to the gas-compressor, for instance a diaphragm compressor, may be connected. Chamber 6 is provided with a discharge pipe 9 for the pressure-water. Two plate valves 10 and 11 are provided in the chamber 5, the hollow central parts of which, according to the form of execution shown in the drawing, are telescopically mounted one into the other. A spiral spring 12 slid on the central part of the valve 10 tends to move the valves 10 and 11 from one another. The valve plate 10 co-operates with a seat 13 located at inlet 7 and the valve plate 11 turned in the opposite direction cooperates with a seat 14 provided at a discharge opening in the partition wall 4. The said seat 13 is provided on a plug screwed into the member 2 of the casing and provided with passages for the pressure-water. Valves 10 and 11 are shifted in the manner stated below by the rod 15 of a piston 16 provided in the chamber 6, which is moved in the one direction by pressure-water admitted into the chamber 1 and in the opposite direction by a piston 17, having a shorter diameter and fixed to the rod 15. The said piston 17 is movable in the hollow central part of the valve body 10 and is uninterruptedly acted upon by pressure-water admitted through the pipe 7, the valve seat or mouth-piece 13, an opening 18 in the valve body 10 and openings 19 between the rod 15 and the said valve body.

A hydraulic relay-valve is provided in the chamber 1 for admitting pressure-water into the same and discharging the said water. In the form of execution shown in the drawing the said relay-valve comprises a piston 20, which is movable in a guide and co-operates with an admission opening 21 for pressure-water and a discharge opening 22. The admission and discharge openings 21 and 22 are provided in plugs screwed into the valve casing. The admission opening 21 communicates through a pipe 23 with the admission pipe 7, and the discharge opening 22 communicates through a pipe 24 with the discharge pipe 9. The passages to the admission opening and from the discharge opening may be adjusted by means of needle valves 25 and 26 respectively screwed into the valve casing. A finger 27 engages the piston 20, which finger extends from an arm 29, swingable on a shaft 28 in the casing 1. A curve shaped plate spring 30 engages a recess provided in the free end of the arm 29 and bears at its other end against a recess located in the casing 1 at a point diametrically opposite to the shaft 28. A shifter 31 is swingably mounted also on the shaft 28 and is provided in its free end with a recess for a second curve shaped plate spring 32, which also bears against a recess provided in the casing 1 at a point diametrically opposite to the shaft 28. In the shown form of execution springs 30 and 32 are curve shaped but the springs may have any shape permitting the same to exert a pressure on the arm 29 and the shifter 31 respectively directed toward the shaft 28. The upward and downward movement of the arm 29 is limited by the admission and discharging mouth-pieces 21 and 22. A slot 38 is provided in the arm 29 and is engaged by a pin 39 provided on the shifter 31.

Two rings 33 and 34 are adjustably fixed on the rod 15 by means of screws for the purpose stated below. The piston rod 15 when moved causes the valves 10 and 11 to partake in its movement by means of a washer 35, held by a nut and provided in its edge with notches, and an offset 36 provided on the rod 15.

In order to prevent water from leaking from the chamber 5 into the chamber 6 at the position of the valves shown in Fig. 1, when pressure prevails in the chamber 5, the valve-body 11 is provided with a tightening disc 37 of leather or the like, bearing against the inner side of the central part of the valve body 10. Also the pistons 16 and 17 are provided with tightening discs of the same type, which, like the disc 37, is held by inner and outer washers.

A strainer 40 is located between the pipe 23 and the mouth-piece 21 in order to prevent foreign particles in the water from stopping up the mouth-pieces 21 and 22. A passage (not shown) extends from the chamber 41, communicating with the inner side of the strainer, to the needle valve 25. The strainer 40 may be cleaned after the removal of a plug 42. The casing 1 is closed by means of thick glass-plate 43 held by means of a ring 44 screwed into the casing.

The pulsator valve operates in the following manner. In the position of the valves 10 and 11 shown in the drawing pressure-water passes from admission pipe 7 to the compressor. At the same time pressure-water passes through the pipe 23 and the admission opening 21 into the chamber 1 and moves the piston 16 downwards against the action of the pressure-water on the piston 17, due to the fact that the area of the piston 17 is smaller than the area of the piston 16, about one half of the same. The distance between the valve-body 11 and the offset 36 is so adapted, that, while the piston-rod 15 moves downwards, the valve 10 is forced against the seat 13 by the spring 12 and interrupts the admission of pressure-water before the offset 36 strikes the valve 11 and opens the same. As the valve 11 is opened, it permits the pressure-water to escape, which previously has entered into the compressor. During the downward motion of the piston 16 the ring 33 on the rod 15 strikes a projection 45 on the shifter 31 and causes the shifter to move downwards. At the instant when the shifter 31 passes the line connecting the centre of the shaft 28 and the recess provided for the outer end of the spring 32, the latter moves the shifter rapidly further downwards, so that the pin 39 strikes the lower end of the slot and swings the arm 29 downwards. The tension of the springs is so adapted, that the spring 32 is able to overcome the resistance exerted by the spring 30 against the motion of the arm 29. Consequently, the piston 20 is moved rapidly upwards, so that the admission opening 21 is closed and the discharge opening 21 is opened. The object of the spring 30 is to hold the piston 20 against the mouth-pieces 21 and 22 respectively. In the position of the piston 20 last mentioned pressure-water escapes from the chamber 1 and owing to the fact that the pressure of the water on the piston 16 is hereby released, the pressure of the water on the piston 17 moves the rod 15 and piston 16 upwards, which results in the discharge valve 11 being first closed and the valve 10 then opened, so that pressure-water again passes to the compressor. During the upward movement of the piston 16 and the rod 15 the ring 34 strikes the projection 45 of the shifter 29 from below and swings the shifter 29 upwards, so that the pin 39 strikes the upper wall of the slot 38 and the arm 29 is swung upwards and moves the piston 20 into its initial position. Pressure-water is now again admitted into the chamber 1 and moves the piston 16 downwards, so that the valves 10 and 11 are again shifted. The described operations are repeated as long as pressure-water is admitted at 7. Consequently, pressure impulses are effected in the gas-compressor causing the same to operate. Owing to the play of the valves 10 and 11 on the piston rod and the spring device acting upon the said valves, the valves do not prevent, when striking their seats, the piston 16 from moving through a distance sufficient for shifting the relay-valve 20. The areas of the pistons 16 and 17 may be so proportioned and so adapted with relation to the tension of the spring 12, that the piston 17 will be unable to open the valve 10, if the pressure of the water should be reduced to a value below the pressure necessary for running the gas compressor. The pulsator and compressor then stop operating automatically.

The pulsator valve described above and shown in the drawing is controlled automatically by means of an hydraulic valve device, as perceived from the above description. In valve devices hitherto used and controlled by such a relay valve, slide-valves or the like are used, for the reason that the relay-device for its function requires an unlimited movement of the piston rod. Such valves however, may not advantageously be used, when the water has a great pressure partly for the reason that the movement of the valves then requires a great amount of power partly for the reason that lubricating matter may be supplied only with difficulty, which results in a rapid wear. Plate valves on the other hand are very suitable but, owing to the fact that they hitherto have been fixed to the piston rod, it has been impossible to use the same, because the relay valve under such circumstances would not functionate in a reliable manner. This difficulty has been overcome by rendering the plate valves movable on the piston rod. Owing to the fact that the valves 10 and 11 and also the relay-valve 20 are arranged like plate valves which are closed by springs, the said valves are subjected to slight wear. The pulsator generally makes from 20 to 25 strokes per minute. The frequency may, however, be regulated to the required number of strokes by means of the control devices 25 and 26 for the admission and discharging passages 21 and 22.

The invention may, evidently, be modified in some respects without exceeding the limits of the same.

We claim:

1. In a pulsator-valve the combination of a piston, a relay-valve device connecting the pressure chamber at the one side of the piston alternately with admission and discharge passages for a pressure-medium, spring actuated valves movable between members shifted by the piston and admitting pressure medium to its functioning place and discharging the same, a lever-arm connected to the relay-valve device for moving the same into its operative positions respectively, a shifter, acted upon by members moved by the said piston, said shifter acting upon the said lever arm and throw-over springs actuating the lever-arm and shifter.

2. In a pulsator-valve, the combination with a valve device opening and closing a passage alternately, of a piston, a relay-valve device connecting the pressure chamber at the one side of the piston alternately with admission and discharge passages for a pressure-medium, means connecting the said piston with the said valve-device for shifting the same, and means returning the piston and the relay-valve device to its initial position at the discharging of the pressure-medium.

3. In a pulsator valve as claimed in claim 2, the provision of a second piston connected to the piston rod, and a passage admitting pressure medium uninterruptedly to the one side of the piston, said second piston being adapted to return the relay valve device into its initial position.

In testimony whereof we have hereunto affixed our signatures.

JOHANNES VALDEMAR MÅRTEN RISBERG.
HJALMAR LINDELÖF.